United States Patent
Yang et al.

(10) Patent No.: US 9,813,742 B2
(45) Date of Patent: Nov. 7, 2017

(54) METHOD, DEVICE AND SYSTEM FOR EVALUATING USER EXPERIENCE VALUE OF VIDEO QUALITY

(71) Applicant: Huawei Technologies Co., Ltd., Shenzhen (CN)

(72) Inventors: Youqing Yang, Shenzhen (CN); Lu Zhang, Shenzhen (CN); Jinhui Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 14/806,475

(22) Filed: Jul. 22, 2015

(65) Prior Publication Data

US 2015/0326898 A1    Nov. 12, 2015

Related U.S. Application Data

(63) Continuation of application No. PCT/CN2014/070958, filed on Jan. 21, 2014.

(30) Foreign Application Priority Data

Jan. 24, 2013    (CN) .......................... 2013 1 0027082

(51) Int. Cl.
*H04N 21/437* (2011.01)
*H04N 21/24* (2011.01)
(Continued)

(52) U.S. Cl.
CPC ..... *H04N 21/2402* (2013.01); *H04N 21/2393* (2013.01); *H04N 21/23605* (2013.01);
(Continued)

(58) Field of Classification Search
CPC ......... H04N 21/2402; H04N 21/44204; H04N 21/44209; H04N 21/23605;
(Continued)

(56) References Cited

U.S. PATENT DOCUMENTS

| | | | |
|---|---|---|---|
| 2010/0034089 A1* | 2/2010 | Kovvali | ............. H04L 67/2842 |
| | | | 370/235 |
| 2011/0167170 A1* | 7/2011 | Kovvali | ................ H04W 28/06 |
| | | | 709/232 |

(Continued)

FOREIGN PATENT DOCUMENTS

| | | |
|---|---|---|
| CN | 102257831 A | 11/2011 |
| CN | 102523291 A | 7/2012 |

(Continued)

*Primary Examiner* — Nathan Flynn
*Assistant Examiner* — Caroline Somera
(74) *Attorney, Agent, or Firm* — Leydig, Voit & Mayer, Ltd.

(57) ABSTRACT

Embodiments of the present disclosure provide a method, a device and a system for evaluating a user experience value of video quality. The method is: acquiring an uplink packet of a user equipment for requesting to watch an OTT video, where the uplink packet is transmitted by the user equipment to a video server storing the OTT video and carries request information of the user equipment on the OTT video; acquiring a downlink packet corresponding to the uplink packet, where the downlink packet is transmitted by the video server to the user equipment and carries the OTT video, and the OTT video is transmitted by the video server according to the request information in the uplink packet; buffering the downlink packet; and in response to determining that the buffered downlink packet satisfies a resolving condition, resolving the OTT video in the buffered downlink packet to generate a user experience value.

10 Claims, 3 Drawing Sheets

(51) Int. Cl.
    *H04N 21/61*      (2011.01)
    *H04N 21/643*     (2011.01)
    *H04N 21/236*     (2011.01)
    *H04N 21/239*     (2011.01)
    *H04N 21/472*     (2011.01)

(52) U.S. Cl.
    CPC ..... *H04N 21/23614* (2013.01); *H04N 21/437* (2013.01); *H04N 21/47202* (2013.01); *H04N 21/6125* (2013.01); *H04N 21/6175* (2013.01); *H04N 21/64322* (2013.01)

(58) Field of Classification Search
    CPC ......... H04N 21/23614; H04N 21/2393; H04N 21/437; H04N 21/47202; H04N 21/6125; H04N 21/6175; H04N 21/64322; H04N 17/004; H04L 65/80
    USPC .............................................. 725/9; 370/252
    See application file for complete search history.

(56) References Cited

U.S. PATENT DOCUMENTS

| | | | |
|---|---|---|---|
| 2011/0225312 A1 | 9/2011 | Liu et al. | |
| 2012/0110167 A1* | 5/2012 | Joch | H04L 65/80 709/224 |
| 2012/0117225 A1* | 5/2012 | Kordasiewicz | H04L 65/1083 709/224 |
| 2012/0188882 A1 | 7/2012 | Wilkinson et al. | |
| 2012/0311126 A1* | 12/2012 | Jadallah | H04L 41/5067 709/224 |
| 2013/0096904 A1* | 4/2013 | Hui | H04L 65/605 703/21 |
| 2013/0159498 A1* | 6/2013 | Funge | H04N 21/44218 709/224 |
| 2013/0219048 A1* | 8/2013 | Arvidsson | H04L 41/5025 709/224 |
| 2013/0290492 A1* | 10/2013 | ElArabawy | H04L 65/80 709/219 |
| 2013/0290525 A1* | 10/2013 | Fedor | H04L 41/147 709/224 |
| 2014/0016487 A1* | 1/2014 | Dorenbosch | H04W 24/06 370/252 |

FOREIGN PATENT DOCUMENTS

| | | |
|---|---|---|
| CN | 102724564 A | 10/2012 |
| EP | 1383334 A2 | 1/2004 |
| EP | 2023627 A2 | 2/2009 |
| EP | 2530870 A1 | 12/2012 |
| JP | 2004056819 A | 2/2004 |
| JP | 2006333332 A | 12/2006 |
| JP | 2009044416 A | 2/2009 |
| JP | 2009273010 A | 11/2009 |
| JP | 2011004354 A | 1/2011 |
| WO | 2011082719 A1 | 7/2011 |

* cited by examiner

US 9,813,742 B2

METHOD, DEVICE AND SYSTEM FOR EVALUATING USER EXPERIENCE VALUE OF VIDEO QUALITY

CROSS-REFERENCE TO RELATED APPLICATIONS

This application is a continuation of International Patent Application No. PCT/CN2014/070958, filed on Jan. 21, 2014, which claims priority to Chinese Patent Application No. 201310027082.4, filed on Jan. 24, 2013, both of which are hereby incorporated by reference in their entireties.

TECHNICAL FIELD

The present disclosure relates to the communication field and, in particular, to a method, a device and a system for evaluating a user experience value of video quality.

BACKGROUND

With increasing development of internet technologies, there are more and more types of services transmitted on a current internet, wherein an internet video service is becoming a major component of network traffic day by day. Presently, more and more users access to an internet video website via devices such as a mobile phone, a computer and a tablet personal computer to watch an OTT (Over The TOP) video, which causes that the OTT video increasingly becomes a major consumption mode of internet traffic.

A current OTT video bearer protocol mainly uses protocols such as an HTTP (Hypertext Transport Protocol)/a TCP (Transmission Control Protocol)/an IP (Internet Protocol), which segments a large video file into videos with different sizes, and quickly downloads the videos onto a terminal used by a user, so that the user makes a downloading while watching a video. However, an internet system has uncertain performance abnormities such as link congestion, and packet loss over a link/an air-interface when busy, thus the user has a bad experience of quality when watching the OTT video, such as image start-up delay, image pause (including long time pause and frequent pause), poor image clarity, etc.

Only if the experience of quality the user to an OTT video is determined, then an optimization can be made for the user experience of quality, but since an OTT video bearer is different from a traditional video, the user experience of quality cannot be determined according to performance indicators such as time delay, packet loss, jitter of a traditional IPTV (Internet Protocol Television) system. When watching the OTT video, the user would usually perform operations of forward and backward shifting the starting point of the video, resulting in invalidation of a part of downlink packets that have been received by a user equipment, at this time, if all downlink packets that have been received by the user equipment are still used to compute a user experience value, then it may cause that the user experience value cannot be evaluated comprehensively and really.

SUMMARY

Embodiments of the present disclosure provide a method, a device and a system for evaluating a user experience value of video quality, which can evaluate a user experience value of OTT video quality more comprehensively, and provide a more real and accurate user experience value.

In order to achieve the above objective, embodiments of the present disclosure use the following technical solutions:

In a first aspect, a method for evaluating a user experience value of video quality is provided, the method includes:

acquiring an uplink packet of a user equipment for requesting to watch an OTT video, where the uplink packet is transmitted by the user equipment to a video server storing the OTT video and carries request information of the user equipment on the OTT video;

acquiring a downlink packet corresponding to the uplink packet, where the downlink packet is transmitted by the video server to the user equipment and carries the OTT video, and the OTT video is transmitted by the video server according to the request information in the uplink packet;

buffering the downlink packet; and resolving the OTT video in the buffered downlink packet to generate a user experience value when the downlink packet buffered by the buffering unit satisfies a resolving condition.

In a second aspect, a device for evaluating a user experience value of video quality is provided, the evaluating device includes:

a user session unit, configured to acquire an uplink packet of a user equipment for requesting to watch an OTT video, where the uplink packet is transmitted by the user equipment to a video server storing the OTT video and carries request information of the user equipment on the OTT video;

a video session unit, configured to acquire a downlink packet corresponding to the uplink packet acquired by the user session unit, where the downlink packet is transmitted by the video server to the user equipment and carries the OTT video, and the OTT video is transmitted by the video server according to the request information in the uplink packet;

a buffering unit, configured to buffer the downlink packet acquired by the video session unit; and an experience evaluating unit, configured to resolve the OTT video in the buffered downlink packet to generate a user experience value when the downlink packet buffered by the buffering unit satisfies a resolving condition.

In a third aspect, a system is provided, including:

the device for evaluating the user experience value of video quality as described above;

the user equipment, configured to transmit the uplink packet to the video server storing the OTT video, where the uplink packet is carried with request information of the user equipment on the OTT video; and further configured to receive the downlink packet transmitted by the video server, where the downlink packet is carried with the OTT video, and the OTT video is transmitted by the video server according to the request information in the uplink packet;

the video server, configured to store the OTT video; further configured to receive the uplink packet transmitted by the user equipment, and transmit the downlink packet to the user equipment.

Embodiments of the present disclosure provide a method, a device and a system for evaluating a user experience value of video quality, the device for evaluating the user experience value of video quality acquires an uplink packet a user equipment for requesting to watch an OTT video, where the uplink packet carries request information of the user equipment on the OTT video; acquires a downlink packet corresponding to the uplink packet, where the downlink packet carries the OTT video; buffers the downlink packet; and when the buffered downlink packet satisfies a resolving condition, resolves the OTT video in the buffered downlink packet to generate a user experience value. In this case, the device for evaluating a user experience value of video quality can acquire a corresponding downlink packet according to an uplink packet, and compute a user experience value according to a valid downlink packet, thereby avoiding effect of an invalid downlink packet on a computing result of the user experience value, thus the user experience value acquired not only can reflect a problem of downlink data, but also can reflect an increase or a reduction of the experience value formed due to different control behaviors of a user, thereby reflecting the user experience more real and comprehensively.

BRIEF DESCRIPTION OF DRAWINGS

In order to illustrate technical solutions in embodiments of the present disclosure more clearly, accompanying drawings used for description of embodiments of the present disclosure will be briefly described hereunder. Obviously, the described drawings are merely some embodiments of present disclosure. For persons skilled in the art, other drawings may be obtained based on these drawings without any creative effort.

DESCRIPTION OF EMBODIMENTS

Technical solutions in embodiments of the present disclosure are hereinafter described clearly with reference to the accompanying drawings in embodiments of the present disclosure. Obviously, the described embodiments are only a part of embodiments of the present disclosure, rather than all embodiments of the present disclosure. All other embodiments obtained by persons of ordinary skill in the art based on embodiments of the present disclosure without any creative effort shall fall within the protection scope of the present disclosure.

Figure 1:
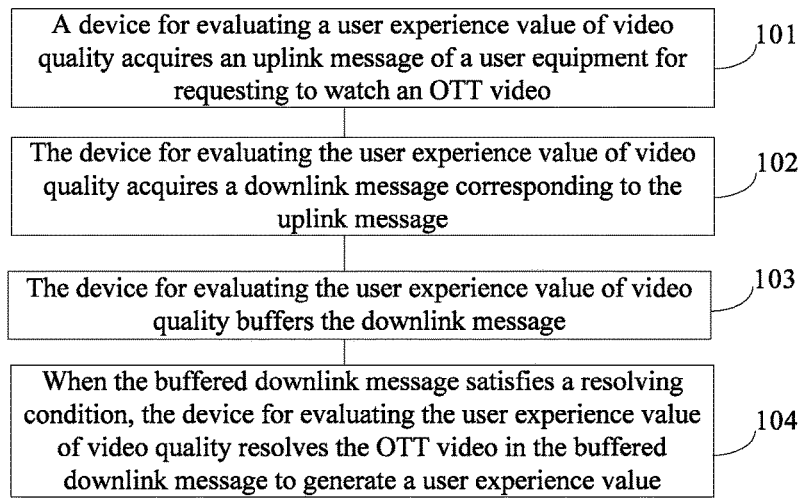
FIG. 1 is a schematic flow chart for evaluating a user experience value of video quality according to an embodiment of the present disclosure.

A method for evaluating a user experience value of video quality according to an embodiment of the present disclosure, as shown in FIG. 1, includes:

Step 101, where a device for evaluating a user experience value of video quality acquires an uplink packet of a user equipment for requesting to watch an OTT video.

It should be noted that, the uplink packet is transmitted by the user equipment to a video server storing the OTT video, and the uplink packet carries request information of the user equipment on the OTT video. The device for evaluating the user experience value of video quality may be built in the video server, and may also be separately provided between the video server and the user equipment, which acquires and monitors an uplink packet and a downlink packet between the video server and the user equipment in real-time. For instance, when being separately provided between the video server and the user equipment, the device for evaluating the user experience value of video quality may be side-hung on a router in a network between the video server and the user equipment, and may acquire the uplink packet of the user equipment for requesting to watch the OTT video by way of port mirroring. For instance, when the device for evaluating the user experience value of video quality is built in the video server, after receiving the uplink packet transmitted by the user equipment, the video server may transmit the uplink packet to the device for evaluating the user experience value of video quality via an internal interface between the video server and the device for evaluating the user experience value of video quality.

For instance, the user equipment may be an internet television integrator or a set-top box plus television capable of receiving the OTT video.

For instance, the request information in the uplink packet may include a control behavior message and status information performed by a user via the user equipment for the OTT video, where the control behavior message includes control behaviors such as shift, pause or replay that are performed by the user equipment when acquiring content of the OTT video, and the status information includes whether a video is played in full screen, a video HTML (Hypertext Markup Language) page URL (Uniform/Universal Resource Locator), etc.

For instance, the request information in the uplink packet may also include information of the user equipment, such as an IP address of the user equipment. The device for evaluating the user experience value of video quality may differentiate a user equipment to which the uplink packet belongs via information of the user equipment such as the IP address of the user equipment. For another example, the device for evaluating the user experience value of video quality may also differentiate a user equipment to which the uplink packet belongs via a dedicated channel used by the uplink packet. It may be determined that whether the user equipment is a specific user equipment by differentiating the user equipment.

For instance, the device for evaluating the user experience value of video quality may buffer uplink packets transmitted by all user equipments, and may also only buffer an uplink packet transmitted by a specific user equipment.

Furthermore, the device for evaluating the user experience value of video quality may stop acquiring the uplink packet after receiving a response message transmitted by the user equipment, where the response message may be transmitted after the user equipment finishes watching the OTT video, and the response message is used to instruct to stop acquiring the uplink packet.

At step 102, the device for evaluating the user experience value of video quality acquires a downlink packet corresponding to the uplink packet.

It should be noted that, the downlink packet is transmitted by the video server to the user equipment, the downlink packet carries the OTT video, and the OTT video is transmitted by the video server according to the request information in the uplink packet. For instance, a first uplink packet request information requests to transmit content of video B starting from the fifth minute and the forty-fifth second, and a second uplink packet request information requests to transmit content of video B starting from the fifteenth minute. A manner that the device for evaluating the user experience value of video quality acquires the downlink packet may be the same as the manner that the device for evaluating the user experience value of video quality acquires the uplink packet in 101 above. Reference can be made to the manner that the device for evaluating the user experience value of video quality acquires the uplink packet in 101 above, which will not be repeated herein.

In further, after acquiring the uplink packet, the device for evaluating the user experience value of video quality may also determine whether to acquire the downlink packet according to the uplink packet, for instance, the device for evaluating the user experience value of video quality may determine whether the user equipment is a specific user equipment according to information of the user equipment in the uplink packet, if the user equipment is a specific user equipment, then it acquires the downlink packet corresponding to the uplink packet, where the specific user equipment may be a user equipment which customizes evaluation of the user experience value, or a user equipment which customizes a high grade video service of high-definition, etc. Or, the device for evaluating the user experience value of video quality, after determining whether the user equipment is a specific user equipment according to information of the user equipment in the uplink packet, may determine whether to acquire the downlink packet according to an OTT video URL requested by the request information in the uplink packet, if the user equipment is a specific user equipment, and the OTT video requested by the request information in the uplink packet is a specific OTT video, then it acquires the downlink packet corresponding to the uplink packet.

In this case, for some user equipments using a monthly service or customizing a high-definition service, or a VIP (Very Important Person) video service, or, for user equipments feedbacking a sense of bad experience via a telephone, a short message or a session window, the downlink packet may be determined to be acquired via the uplink packet, thereby evaluating the user equipments more targetedly, and avoiding current status that the device for evaluating the user experience value of video quality blindly monitors and acquires a mass of downlink packets, and resolves the OTT video therefrom, reducing data processing amount, and improving processing performance of the device for evaluating the user experience value of video quality.

At step 103, the device for evaluating the user experience value of video quality buffers the downlink packet.

For instance, after the device for evaluating the user experience value of video quality acquires a first uplink packet, e.g., the first uplink packet request information requests to transmit content of video B starting from the fifth minute and the forty-fifth second, the device for evaluating the user experience value of video quality needs to acquire one hundred downlink packets corresponding to the first uplink packet accordingly, and buffer them, however, when the device for evaluating the user experience value of video quality acquires and buffers a thirtieth downlink packet, the user equipment shifts the OTT video watched, that is, the user equipment transmits a second uplink packet to the video server, e.g., the second uplink packet request information requests to transmit content of video B starting from the fifteenth minute, and it is supposed that the content of the video B starting from the fifteenth minute is a fortieth downlink packet to a hundredth downlink packet in the hundred downlink packets, then, the video server transmits downlink packets to the user equipment starting from the fortieth downlink packet, at this time downlink packets acquired by the device for evaluating the user experience value of video quality also start from the fortieth packet, and at this time, first thirty downlink packets buffered correspond to the first uplink packet, and the fortieth to the hundredth downlink packets buffered correspond to the second uplink packet.

For instance, the device for evaluating the user experience value of video quality can buffer the downlink packet, since space occupied for buffering the downlink packet is large, the device for evaluating the user experience value of video quality can also buffer video attribute information of the OTT video in the downlink packet, e.g., can buffer 10 kb for video data size in the downlink packet, 30 kb/s for a video frame rate, etc., instead of really buffering the 10 kb data in the device for evaluating the user experience value of video quality. Thus, buffer load may be reduced, and performance of the device for evaluating the user experience value of video quality is improved.

The video attribute information is as shown in Table 1, including video file resolution and video play time that can be used to generate a user experience value.

TABLE 1

| Video file resolution | Video play duration | Video frame rate | Video size |
|---|---|---|---|
| 720 * 900 | 30 min | 30 k/s | 100 M |

At step 104, when the buffered downlink packet satisfies a resolving condition, the device for evaluating the user experience value of video quality resolves the OTT video in the buffered downlink packet to generate a user experience value.

It should be noted that, when downlink packets buffered by the device for evaluating the user experience value of video quality accumulate to a number that may be resolved or data sum of downlink packets is greater than a predetermined threshold value, then resolution may be performed to the downlink packets to generate the user experience value, where the user experience value may be an MOS-V (Mean Opinion Score-Video, mean opinion score-video) value.

It should be noted that, as described above, if the device for evaluating the user experience value of video quality acquires every ten downlink packets, the resolution can be performed, then, after a first uplink packet is acquired, when a thirtieth downlink packet is buffered and first twenty uplink packets are resolved, a second uplink packet is acquired, at this time, the device for evaluating the user experience value of video quality starts to buffer a fortieth downlink packet to a hundredth downlink packet, and continues to resolve from the fortieth downlink packet, finally, the user experience value can be generated according to the resolved first twenty downlink packets, and the fortieth to the hundredth downlink packet. A twenty-first downlink packet to the thirtieth downlink packet in the buffered first thirty downlink packets become invalid packets, when the device for evaluating the user experience value of video quality generates the user experience value, these invalid downlink packets are not resolved. Thus, not only computation cost of the user experience value is reduced, but also an effect caused by the invalid downlink packets on a computing result is eliminated, thereby acquiring a more accurate user experience value.

It should be noted that, after acquiring the second uplink packet above and buffering the downlink packet corresponding to the second uplink packet, the device for evaluating the user experience value of video quality deletes a downlink packet corresponding to the buffered first uplink packet, thus, buffering amount for the packets of the device for evaluating the user experience value of video quality can be reduced, and buffering space is saved.

In the method for evaluating the user experience value of video quality provided by the embodiment of the present disclosure, the device for evaluating the user experience value of video quality acquires the uplink packet of the user equipment for requesting to watch the OTT video, where the uplink packet carries request information of the user equipment on the OTT video; acquires a downlink packet corresponding to the uplink packet, where the downlink packet carries the OTT video; buffers the downlink packet; and when the buffered downlink packet satisfies the resolving condition, resolves the OTT video in the buffered downlink packet to generate the user experience value. In this case, the device for evaluating a user experience value of video quality can acquire a corresponding downlink packet according to the uplink packet, and compute the user experience value for the valid downlink packet, thereby avoiding the effect of the invalid downlink packet on a computing result of the user experience value, thus the user experience value acquired not only can reflect a problem of downlink data, but also can reflect an increase or a reduction of the experience value formed due to different control behaviors of the user, thereby reflecting the user experience more real and comprehensively.

Figure 2:
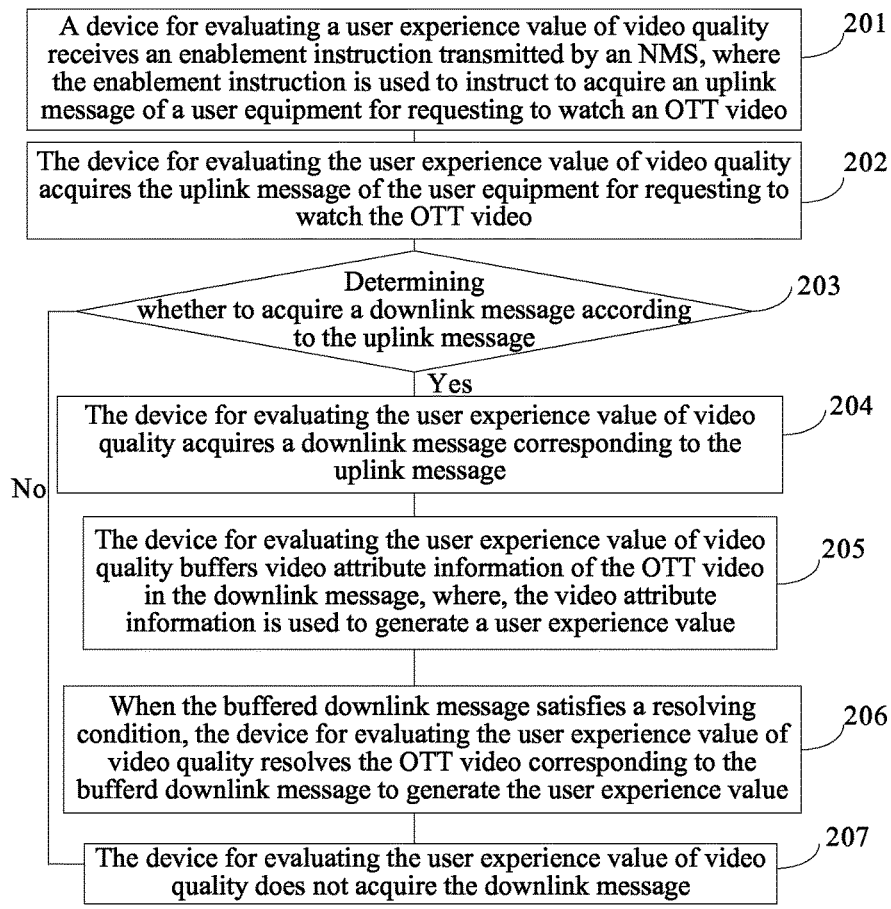
FIG. 2 is a schematic flow chart for evaluating a user experience value of video quality according to another embodiment of the present disclosure.

Another embodiment of the present disclosure provides a method for evaluating a user experience value of video quality, as shown in FIG. 2, the method includes steps of:

Step 201, where a device for evaluating a user experience value of video quality receives an enablement instruction transmitted by an NMS, where the enablement instruction is used to instruct to acquire an uplink packet of a user equipment for requesting to watch an OTT video.

For instance, the device for evaluating the user experience value of video quality can also acquire the uplink packet via other manners in addition to receiving the enablement instruction, e.g., the device for evaluating the user experience value of video quality keeps acquiring uplink packets after being enabled. This embodiment is described by taking an example where the uplink packet starts to be acquired according to the enablement instruction, but a limitation is not made thereto.

At step 202, the device for evaluating the user experience value of video quality acquires the uplink packet of the user equipment for requesting to watch the OTT video.

With regard to how the device for evaluating the user experience value of video quality acquires the uplink packet, reference may be made to descriptions in 101 of the embodiment as shown in FIG. 1, which will not be repeated herein.

At step 203, the device for evaluating the user experience value of video quality determines whether to acquire a downlink packet according to the uplink packet. If it is necessary to acquire, and then the method proceeds with step 204, otherwise proceeds with step 207.

For instance, the device for evaluating the user experience value of video quality determines whether the user equipment is a specific user equipment according to the uplink packet, if the user equipment is a specific user equipment, then the method proceeds with step 204, if the user equipment does not belong to the specific user equipment, then the method proceeds with step 207. Or, after determining whether the user equipment is a specific user equipment according to the uplink packet, the device for evaluating the user experience value of video quality then determines whether the OTT video requested by the uplink packet is a specific OTT video, if the OTT video is a specific OTT video, then the method proceeds with step 204, if the OTT video does not belong to the specific OTT video, then the method proceeds with step 207.

At step 204, the device for evaluating the user experience value of video quality acquires the downlink packet corresponding to the uplink packet.

The downlink packet is transmitted by the video server to the user equipment and carries the OTT video, and the OTT video is transmitted by the video server according to the request information in the uplink packet.

With regard to how the device for evaluating the user experience value of video quality acquires the downlink packet, reference can be made to descriptions in 102 of the embodiment as shown in FIG. 1, which will not be repeated herein.

At step 205, the device for evaluating the user experience value of video quality buffers video attribute information of the OTT video in the downlink packet, where the video attribute information is used to generate a user experience value.

For instance, the video attribute information can be buffered in a particular form of table, as shown in Table 1 of the above embodiment, more content can also be provided in the table, as shown in Table 2, so that the buffered downlink packet information becomes more consummated, e.g., a TCP serial number is added to determine whether downlink packets are consecutive.

TABLE 2

| TCP serial number | Video size | Type | File name | Video file resolution | Video play duration | Video frame rate |
|---|---|---|---|---|---|---|
| 1001 | 300M | Audio | File S | 720*1100 | 1 h | 100 k/s |

It should be noted that, Table 1 and Table 2 are only formats of a particular table, which is used for illustration herein, and a limitation is not made to the formats of Table 1 and Table 2, formats of other particular tables fall into the protection scope. Moreover, the video attribute information is buffered using the formats of the above particular tables besides, other record forms may also be used for buffering, and a limitation is not made thereto.

At step 206, when the buffered downlink packet satisfies a resolving condition, the device for evaluating the user experience value of video quality resolves the OTT video corresponding to the buffered downlink packet to generate the user experience value.

Figure 3:
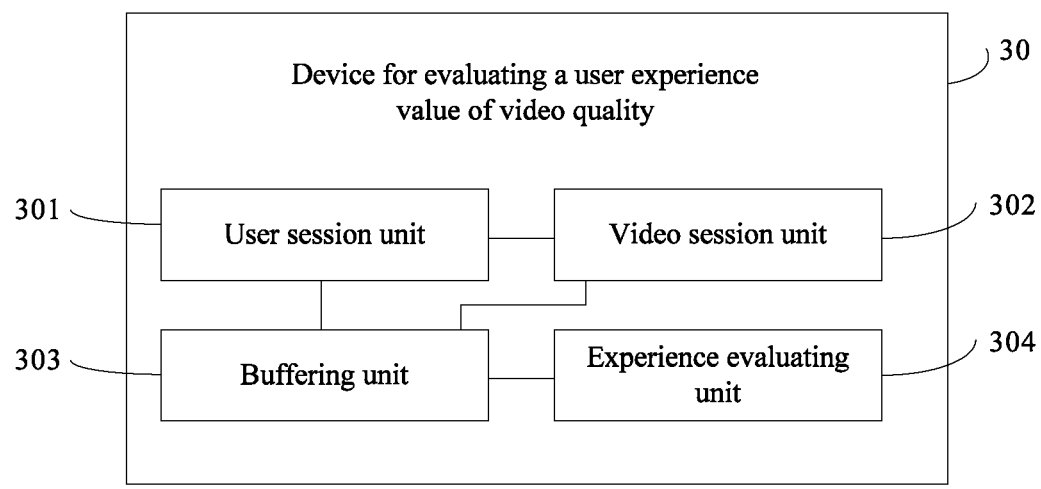
FIG. 3 is a schematic structural diagram of a device for evaluating a user experience value of video quality according to an embodiment of the present disclosure.

For instance, the generated user experience value can be an MOS-V value. The MOS-V is indicated as a subjective experience value to watch a video, as shown in FIG. 3, the subjective feeling for a user to watch the video can be determined via the generated MOS-V value.

TABLE 3

| MOS score | Subjective opinion | MOS-V value |
|---|---|---|
| 4-5 | Excellent | No sense of distortion |
| 3-4 | Good | Slightly be aware of distortion, but without disgust |
| 2-3 | Average | Be aware of distortion, with slight disgust |
| 1-2 | Weak | Disgusted, but tolerable |
| <1 | Bad | Extremely disgusted, intolerable |

At step 207, the device for evaluating the user experience value of video quality does not acquire the downlink packet.

For instance, the device for evaluating the user experience value of video quality can stop port mirroring to not acquire the downlink packet.

For instance, when the device for evaluating the user experience value of video quality is side-hung on a router in a network between the video server and the user equipment, and the downlink packet requested by the user equipment to watch the OTT video cannot be acquired by way of stop port mirroring. For instance, when the device for evaluating the user experience value of video quality is built in the video server, the video server can enable the device for evaluating the user experience value of video quality not to acquire the downlink packet by not transmitting the downlink packet to the device for evaluating the user experience value of video quality.

In the method for evaluating the user experience value of video quality provided by the embodiment of the present disclosure, the device for evaluating the user experience value of video quality acquires the uplink packet of the user equipment for requesting to watch the OTT video, where the uplink packet carries request information of the user equipment on the OTT video; acquires the downlink packet corresponding to the uplink packet, where the downlink packet carries the OTT video; buffers the downlink packet; and when the buffered downlink packet satisfies the resolving condition, resolves the OTT video in the buffered downlink packet to generate the user experience value. In this case, the device for evaluating a user experience value of video quality can acquire a corresponding downlink packet according to the uplink packet, and compute the user experience value for the valid downlink packet, thereby avoiding the effect of the invalid downlink packet on a computing result of the user experience value, thus the user experience value acquired not only can reflect a problem of downlink data, but also can reflect an increase or a reduction of the experience value formed due to different control behaviors of the user, thereby reflecting the user experience more real and comprehensively.

The device 30 for evaluating the user experience value of video quality according to the present disclosure, as shown in FIG. 3, includes:

a user session unit 301, configured to acquire an uplink packet of a user equipment for requesting to watch an OTT video, where the uplink packet is transmitted by the user equipment to a video server storing the OTT video and carries request information of the user equipment on the OTT video.

In further, the request information in the uplink packet acquired by the user session unit 301 can include control information, status information, and information of the user equipment.

a video session unit 302, configured to acquire a downlink packet corresponding to the uplink packet acquired by the user session unit 301, where the downlink packet is transmitted by the video server to the user equipment and carries the OTT video, and the OTT video is transmitted by the video server according to the request information in the uplink packet.

In further, the video session unit 302 can also determine whether to acquire the downlink packet according to the uplink packet acquired by the user session unit 301. For instance, it is determined whether the user equipment is a specific user equipment according to the uplink packet acquired by the user session unit 301, if the user equipment is a specific user equipment, then the video session unit 302 acquires the downlink packet transmitted to the user equipment. Or, after it is determined that the user equipment is a specific user equipment according to the uplink packet acquired by the user session unit 301, it is then determined whether the OTT video requested by the uplink packet is a specific OTT video, if the OTT video is a specific OTT video, then the video session unit 302 acquires the downlink packet transmitted to the user equipment.

a buffering unit 303, configured to buffer the downlink packet acquired by the video session unit 302.

In further, the buffering unit 303 buffers video attribute information of the OTT video in the downlink packet acquired by the video session unit 302, where the video attribute information is configured to generate the user experience value.

an experience evaluating unit 304, configured to resolve the OTT video corresponding to the buffered downlink packet to generate a user experience value when the downlink packet buffered by the buffering unit 303 satisfies a resolving condition.

Illustratively, the experience evaluating unit 304 can perform a mean opinion score-video evaluation to generate an MOS-V value according to the downlink packet or the video attribute information buffered by the buffering unit 303.

In further, the user session unit 301 can also receive an enablement instruction transmitted by an NMS before acquiring the uplink packet of the user equipment for requesting to watch the OTT video, where the enablement instruction is used to instruct to keep acquiring the uplink packet of the user equipment for requesting to watch the OTT video.

The device 30 for evaluating the user experience value of video quality can be in operation by using the method provided by the embodiments above, the operating method is the same as the method provided by the embodiments, which will not be repeated herein.

Embodiments of the present disclosure provide a device 30 for evaluating a user experience value of video quality, the device 30 for evaluating the user experience value of video quality acquires an uplink packet of a user equipment for requesting to watch an OTT video, where the uplink packet carries request information of the user equipment on the OTT video; acquires a downlink packet corresponding to the uplink packet, where the downlink packet carries the OTT video; buffers the downlink packet; and when the buffered downlink packet satisfies a resolving condition, resolves the OTT video in the buffered downlink packet to generate a user experience value. In this case, the device 30 for evaluating the user experience value of video quality can acquire a corresponding downlink packet according to the uplink packet, and compute a user experience value for a valid downlink packet, thereby avoiding the effect of invalid downlink packet on a computing result of the user experience value, thus the user experience value acquired not only can reflect a problem of downlink data, but also can reflect an increase or a reduction of the experience value formed due to different control behaviors of a user, thereby reflecting the user experience more real and comprehensively.

Figure 4:
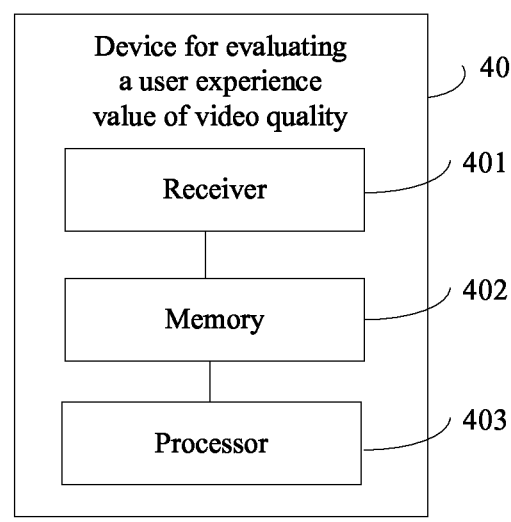
FIG. 4 is a schematic structural diagram of a device for evaluating a user experience value of video quality according to another embodiment of the present disclosure.

The device 40 for evaluating the user experience value of video quality according to the present disclosure, as shown in FIG. 4, includes: a receiver 401, a memory 402 and a processor 403.

The receiver 401 can be configured to acquire an uplink packet and a downlink packet corresponding to the uplink packet that are transmitted between a user equipment and a video server storing an OTT video, and transmit the acquired downlink packet to the memory 402 to be buffered. The uplink packet carries request information of the user equipment on the OTT video, and the downlink packet carries the OTT video, the OTT video is transmitted by the video server to the user equipment according to the request information in the uplink packet. The receiver 401 can acquire the uplink packet and the downlink packet transmitted via wireless communications or a wired network, and the wireless communications can use any communication standard or protocol, including but not limited to a GSM (Global System of Mobile communication, global system of mobile communication), a GPRS (General Packet Radio Service, general packet radio service), a CDMA (Code Division Multiple Access, code division multiple access), a WCDMA (Wideband Code Division Multiple Access, wideband code division multiple access), an LTE (Long Term Evolution, long term evolution), an e-mail, an SMS (Short Messaging Service, short messaging service), etc.

The memory 402 may be configured to buffer the downlink packet obtained via the receiver 401.

The processor 403 is a resolution processing center of the device 40 for evaluating the user experience value of video quality, and generates a user experience value by resolving the OTT video buffered in the memory 402. For instance, an MOS-V value is generated.

In further, the memory 402 can be configured to buffer video attribute information of the OTT video of the downlink packet obtained via the receiver 401, and the processor 403 resolves the video attribute information of the downlink packet buffered in the memory 402 to generate a user experience value.

In further, the receiver 401 can also receive an enablement instruction transmitted by an NMS before acquiring the uplink packet of the user equipment for requesting to watch the OTT video, where the enablement instruction is used to instruct to keep acquiring the uplink packet of the user equipment for requesting to watch the OTT video, and then acquire the downlink packet corresponding to the uplink packet.

The device 40 for evaluating the user experience value of video quality can be in operation by using the method provided by the embodiments above, and the operating method is the same as the method provided by the embodiments, which will not be repeated herein.

Embodiments of the present disclosure provide the device 40 for evaluating the user experience value of video quality, the device 40 for evaluating the user experience value of video quality acquires the uplink packet of the user equipment for requesting to watch an OTT video, where the uplink packet carries request information of the user equipment on the OTT video; acquires a downlink packet corresponding to the uplink packet, where the downlink packet carries the OTT video; buffers the downlink packet; and when the buffered downlink packet satisfies a resolving condition, resolves the OTT video in the buffered downlink packet to generate the user experience value. In this case, the device 40 for evaluating the user experience value of video quality can acquire a corresponding downlink packet according to the uplink packet, and compute the user experience value according to a valid downlink packet, thereby avoiding the effect of the invalid downlink packet on a computing result of the user experience value, thus the user experience value acquired not only can reflect a problem of downlink data, but also can reflect an increase or a reduction of the experience value formed due to different control behaviors of the user, thereby reflecting the user experience more real and comprehensively.

Figure 5:
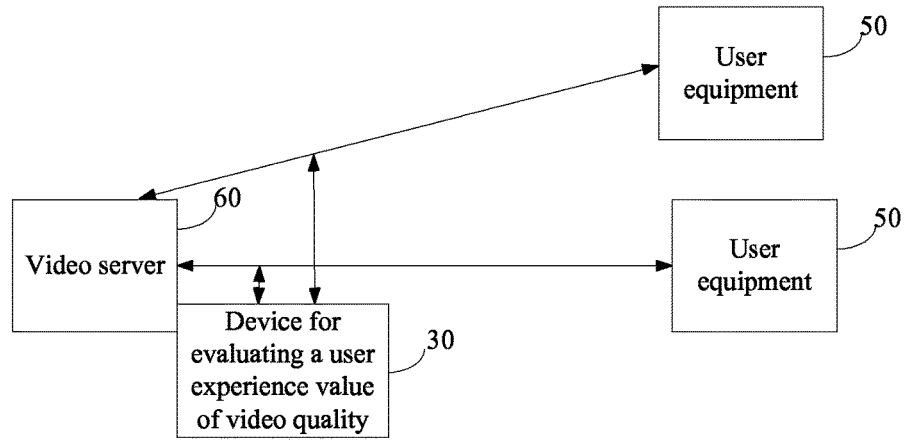
FIG. 5 is a schematic structural diagram of a system according to an embodiment of the present disclosure.
Figure 6:
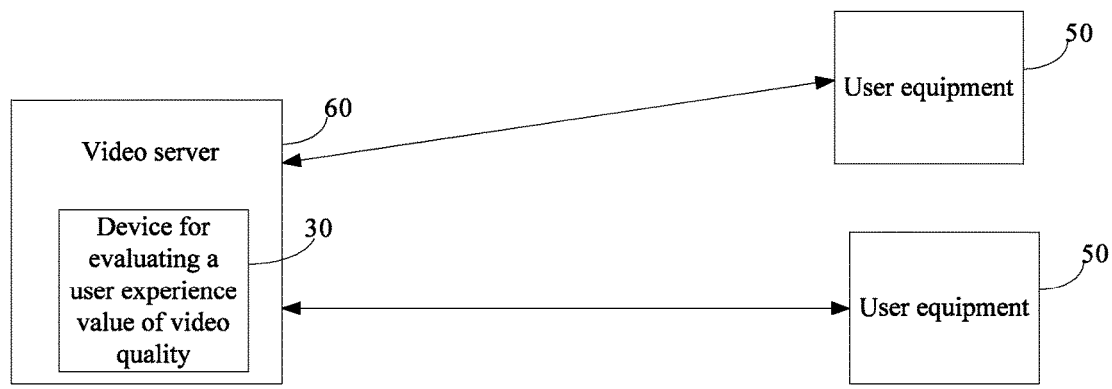
FIG. 6 is a schematic structural diagram of a system according to another embodiment of the present disclosure.

The present disclosure provides a system, as shown in FIG. 5 and FIG. 6, the system includes:

It should be noted that, the device 30 for evaluating the user experience value of video quality indicated in FIG. 5 is separately provided between a video server 60 and a user equipment 50, and the device 30 for evaluating the user experience value of video quality indicated in FIG. 6 is built in a video server 60.

The device 30 for evaluating the user experience value of video quality is provided in the embodiments above.

The user equipment 50 is configured to transmit an uplink packet to the video server 60 storing an OTT video, where the uplink packet is carried with request information of the user equipment on the OTT video; and is further configured to receive a downlink packet transmitted by the video server, where the downlink packet is carried with the OTT video, and the OTT video is transmitted by the video server 60 according to the request information in the uplink packet.

The video server 60 is configured to store the OTT video; and is further configured to receive the uplink packet transmitted by the user equipment 50, and transmit the downlink packet to the user equipment 50.

It should be noted that, the device 30 for evaluating the user experience value of video quality corresponds to the method embodiments above, and the device 30 for evaluating the user experience value of video quality can be used in steps of the method embodiments above, reference may be made to the above method embodiments for an application in specific steps. A specific structure of the device 30 for evaluating the user experience value of video quality and the device 30 for evaluating the user experience value of video quality provided in the above embodiments will not repeated herein.

In the system provided by the embodiment of the present disclosure, the device 30 for evaluating the user experience value of video quality acquires an uplink packet of a user equipment 50 for requesting to watch an OTT video, where the uplink packet carries request information of the user equipment 50 on the OTT video; acquires a downlink packet corresponding to the uplink packet, where the downlink packet carries the OTT video; buffers the downlink packet; and when the buffered downlink packet satisfies a resolving condition, resolves the OTT video in the buffered downlink packet to generate a user experience value. In this case, the device 30 for evaluating the user experience value of video quality can acquire a corresponding downlink packet according to an uplink packet, and compute a user experience value according to a valid downlink packet, thereby avoiding an effect of an invalid downlink packet on a computing result of the user experience value, thus the user experience value acquired not only can reflect a problem of downlink data, but also can reflect an increase or a reduction of the experience value formed due to different control behaviors of a user, thereby reflecting the user experience more real and comprehensively.

Persons of ordinary skill in the art can understand that, all or a part of the steps of the foregoing method embodiments can be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

The above descriptions are merely implementations of the present disclosure, but the protection scope of the present disclosure should not be limited thereto. Any modification or replacement that may be readily envisaged of by persons skilled in the art within the technical scope disclosed in the present disclosure shall fall into the protection scope of the present disclosure. Thus, the protection scope of the present disclosure should be subject to the protection scope of the claims.

What is claimed is:

1. A method for evaluating a user experience value of video quality, comprising:
   acquiring a first uplink packet of a user equipment for requesting to watch an over-the-top (OTT) video, wherein the first uplink packet is transmitted by the user equipment to a video server storing the OTT video and carries request information of the user equipment on the OTT video, wherein the request information comprises information of the user equipment;
   determining, according to the information of the user equipment in the first uplink packet, whether to acquire a downlink packet;
   upon determining that the user equipment is a specific user equipment, acquiring a downlink packet corresponding to the first uplink packet, wherein the downlink packet is transmitted by the video server to the user equipment and carries the OTT video, and the OTT video is transmitted by the video server according to the request information in the first uplink packet, wherein the specific user equipment is at least one of a user equipment that customizes evaluation of the user experience value and a user equipment that customizes a high-definition video service;
   buffering the downlink packet; and
   resolving the OTT video in the buffered downlink packet to generate a user experience value in response to determining that the buffered downlink packet satisfies a resolving condition, wherein a buffered downlink packet, which corresponds to the first uplink packet and has not been resolved when a second uplink packet is acquired, is not used for generating the user experience value.

2. The method according to claim 1, wherein the buffering the downlink packet comprises:
   buffering video attribute information of the OTT video in the downlink packet, wherein the video attribute information is used to generate the user experience value.

3. The method according to claim 1, wherein the user experience value is a mean opinion score-video (MOS-V) value.

4. The method according to claim 1, wherein, before the acquiring the first uplink packet of the user equipment for requesting to watch the OTT video, the method further comprises:
   receiving an enablement instruction transmitted by a network management system (NMS), wherein the enablement instruction is used to instruct to acquire the first uplink packet of the user equipment for requesting to watch the OTT video.

5. A device for evaluating a user experience value of video quality, comprising:
   a memory storing computer-executable instructions; and
   a processor configured to execute the instructions to perform operations comprising:
      acquiring a first uplink packet of a user equipment for requesting to watch an over-the-top (OTT) video, wherein the first uplink packet is transmitted by the user equipment to a video server storing the OTT video and carries request information of the user equipment on the OTT video, wherein the request information comprises information of the user equipment;
      determining, according to the information of the user equipment in the first uplink packet, whether to acquire a downlink packet;
      upon determining that the user equipment is a specific user equipment, acquiring a downlink packet corresponding to the first uplink packet, wherein the downlink packet is transmitted by the video server to the user equipment and carries the OTT video, and the OTT video is transmitted by the video server according to the request information in the first uplink packet, wherein the specific user equipment is at least one of a user equipment that customizes evaluation of the user experience value and a user equipment that customizes a high-definition video service;
      buffering the downlink packet; and
      resolving the OTT video in the buffered downlink packet to generate a user experience value in response to determining that the buffered downlink packet satisfies a resolving condition, wherein a buffered downlink packet, which corresponds to the first uplink packet and has not been resolved when a second uplink packet is acquired, is not used for generating the user experience value.

6. The device according to claim 5, wherein the operations further comprise:
   buffering video attribute information of the OTT video in the downlink packet, wherein the video attribute information is used to generate the user experience value.

7. The device according to claim 5, wherein the operations further comprise:
   receiving an enablement instruction transmitted by a network management system (NMS), wherein the enablement instruction is used to instruct to acquire the first uplink packet of the user equipment for requesting to watch the OTT video.

8. A system for evaluating a user experience value of video quality, comprising:
   a device for evaluating a user experience value of video quality;
   a user equipment; and
   a video server,
   wherein the device is configured to perform operations comprising:
      acquiring a first uplink packet of a user equipment for requesting to watch an over-the-top (OTT) video, wherein the first uplink packet is transmitted by the user equipment to a video server storing the OTT video and carries request information of the user equipment on the OTT video, wherein the request information comprises information of the user equipment,
      determining, according to the information of the user equipment in the first uplink packet, whether to acquire a downlink packet,
      upon determining that the user equipment is a specific user equipment, acquiring a downlink packet corresponding to the first uplink packet, wherein the downlink packet is transmitted by the video server to the user equipment and carries the OTT video, and the OTT video is transmitted by the video server according to the request information in the first uplink packet wherein the specific user equipment is at least one of a user equipment that customizes evaluation of the user experience value and a user equipment that customizes a high-definition video service, buffering the downlink packet, and
resolving the OTT video in the buffered downlink packet to generate a user experience value in response to determining that the buffered downlink packet satisfies a resolving condition, wherein a buffered downlink packet, which corresponds to the first uplink packet and has not been resolved when a second uplink packet is acquired, is not used for generating the user experience value; and wherein the user equipment is configured to perform operations comprising:
transmitting the first uplink packet to the video server storing the OTT video, wherein the first uplink packet carries the request information of the user equipment on the OTT video, and
receiving the downlink packet transmitted by the video server, wherein the downlink packet carries the OTT video, and the OTT video is transmitted by the video server according to the request information in the first uplink packet; and wherein the video server is configured to perform operations comprising:
storing the OTT video, and
receiving the first uplink packet transmitted by the user equipment, and
transmitting the downlink packet to the user equipment.

9. The system according to claim 8, wherein the device is further configured to perform operations comprising:
when buffering the downlink packet, buffering video attribute information of the OTT video in the downlink packet, wherein the video attribute information is used to generate the user experience value.

10. The system according to claim 8, wherein the device is further configured to perform operations comprising:
receiving an enablement instruction transmitted by a network management system (NMS), wherein the enablement instruction is used to instruct to acquire the first uplink packet of the user equipment for requesting to watch the OTT video.

* * * * *